United States Patent Office 3,153,086
Patented Oct. 13, 1964

3,153,086
PRODUCTION OF DIMETHYLAMINO-
ACETONITRILE
John E. Mahan and Anton M. Schnitzer, Bartlesville, Okla., assignors to Phillips Petroleum Company, a corporation of Delaware
No Drawing. Filed Nov. 6, 1961, Ser. No. 150,167
11 Claims. (Cl. 260—465.5)

This invention relates to the production of dimethylaminoacetonitrile. In one of its aspects, it relates to the production of dimethylaminoacetonitrile by subjecting dimethylamine to the action of a selected heterogeneous catalyst such as a chroma-alumina catalyst at a temperature in the approximate range 400–900° C. In another of its aspects, the invention relates to the production of dimethylaminoacetonitrile from dimethylamine by heating the same in the absence of a catalyst to a temperature in the given range. In a still further aspect of the invention, it relates to the utilization of lower temperatures in the presence of a catalyst and higher temperatures in the absence of a catalyst, the said temperatures being within the given range.

Accordance to the present invention, it has been found that dimethylaminoacetonitrile can be prepared by subjecting dimethylamine to conditions essentially approximating those of a dehydrogenation process. The reaction can be catalytic or thermal in character and when thermal, will usually be an oxidative dehydrogenation type of operation. While the process of this invention is carried out in the manner of a dehydrogenation process, and while dehydrogenation is one of the reactions taking place, it is apparent that a rearrangement reaction and a condensation reaction are taking place to yield the final product of the process.

It is an object of this invention to produce dimethylaminoacetonitrile. It is a further object of this invention to produce dimethylaminoacetonitrile from dimethylamine. It is a further object of this invention to provide a simplified procedure for producing dimethylaminoacetonitrile from dimethylamine.

Other aspects, objects and the several advantages of this invention will become apparent from a study of this disclosure and the appended claims.

According to the present invention, dimethylaminoacetonitrile is produced by subjecting dimethylamine to an elevated temperature in the approximate range 400–900° C. The general conditions of the operation are those which are ordinarily employed in dehydrogenation reactions and, if desired, a catalyst such as a chromia-alumina dehydrogenation catalyst can be employed. In the case of catalytic dehydrogenation conditions, temperatures in the lower portion of the above range will generally be employed and will, for example, lie in the range of 400–750° C. approximately. In the absence of a catalyst, oxidative dehydrogenation conditions will be employed and the temperature will lie in the approximate range 750–900° C. Other catalysts than that already mentioned herein can be employed. Thus, thorium oxide on alumina and other catalysts such as chromium oxide together with calcium oxide or other alkaline earth metal oxides and/or an alkali metal oxide or hydroxide can be used. Catalysts such as those disclosed in Wagner Patent 2,732,376 for the dehydrogenation of alkyl pyridines can be used. Further, other chromia catalysts which can be employed include those of Oberlin et al., Patent 2,891,956, issued in 1959, which contain approximately 0.5–5 weight percent of $Cr_2O_3$, 15–30 $CaCO_3$, and the remainder, $Fe_2O_3$ and Pitzer Patent, 2,866,791, issued in 1958, containing 10–60 weight percent KF, 0.2–20 $Cr_2O_3$, and the balance $Fe_2O_3$.

When the process of the present invention is effected in the absence of a catalyst and oxidative dehydrogenation conditions are employed, the dimethylamine to be converted is preheated and contacted with a preheated stream of an oxidizing gas such as air under turbulent conditions such that thorough mixing is obtained very rapidly. The reaction mixture is then quickly mixed with a cooling stream or quenching medium and the resulting mixture is expanded through a convergent-divergent nozzle such as a De Laval nozzle. By operating in this fashion, extremely short reaction times are obtained, these reaction times often being less than 10 milliseconds. This short reaction time and immediate quenching enables one to employ oxidative dehydrogenation conditions without producing large quantities of more completely oxidized materials.

Whatever process is employed to effect the conversion of dimethylamine, dimethylaminoacetonitrile is produced when the conditions set forth above are maintained. The effluent from the conversion zone can be treated for the recovery of the product and for recovery or unconverted dimethylamine for recycle to the reaction zone. For example, the reaction effluent can be condensed and separated from any water present. The water present may be formed by oxidation in the reaction zone, or it may have been charged as reaction diluent in the form of steam. Furthermore, in a process employing oxidative dehydrogenation conditions, the water may have been charged as the quenching medium. After separating the organic material from the water, the organic phase can be treated for recovery of products by such processes as fractionation, extraction and the like. Such processes are well known to those skilled in the art and do not require further description herein.

The product of this invention, dimethylaminoacetonitrile, also named N,N-dimethylglycinonitrile, is useful as a solvent for polyacrylonitrile. The compound is also useful as a chemical intermediate, as it can be partially hydrolyzed to the corresponding amide, or it can be reduced to the primary amine, dimethylaminoethylamine. Other derivatives of this compound can be prepared which are obvious to those skilled in the art.

The following specific examples are intended to illustrate the advantages of the process of this invention, but it is not intended to limit the invention to the specific embodiments shown in these examples.

EXAMPLE I

Two runs were carried out in which dimethylamine was subjected to oxidative dehydrogenation conditions.

In each of these runs, flowing streams of air and steam were mixed together, the resulting mixture was heated, and the heated mixture was fed continuously to a reactor. The reactor comprised a cylinder, closed at one end, the open end of which was attached to the convergent section of a convergent-divergent nozzle. A quench water inlet was provided immediately upstream of the nozzle throat. Simultaneously, a stream of preheated dimethylamine was fed continuously to the reactor. The feed inlets for the steam-air and dimethylamine streams were each located adjacent to the closed end of the reactor and entered normal to the axis of the cylinder such that the two streams impinged directly on each other. The quenched effluent from the reactor was passed directly into a series of condensers so that all condensable materials could be collected and non-condensables vented off.

The conditions for these runs were as follows:

| Run No. | 1 | 2 |
|---|---|---|
| Dimethylamine feed rate, #/hr | 4.5 | 4.5 |
| Steam feed rate, #/hr | 2.34 | 2.34 |
| Oxygen feed rate, #/hr.[1] | 0.80 | 0.92 |
| Quench water feed rate, #/hr | 6.0 | 6.0 |
| Dimethylamine feed temp., °C | 599 | 594 |
| $O_2$-Steam mixture feed temp., °C | 596 | 565 |
| Reactor temp., °C | 802 | 818 |
| Reactor pressure, p.s.i.g | 139 | 125 |
| Length of run, minutes | 6.0 | 10.0 |
| Reactor volume, cubic inches | 0.1012 | 0.1012 |
| Calculated residence time, milliseconds | 5.2 | 5.4 |

[1] Fed as air, but expressed as oxygen.

In Run 1, 616 grams of effluent was recovered, while in Run 2, 993 grams was recovered.

In Run 1, 448 grams of the effluent was saturated with KOH, and the hydrocarbon and aqueous phases were separated. The hydrocarbon phase was treated with NaOH, and the mixture was heated to 55° C. Another aqueous layer was formed, which was separated after cooling. The hydrocarbon remaining weighed 91.4 grams. This material was then fractionated and several fractions were collected. The fractions boiling at 54.2° C. to 56.2° C. at 17 mm. Hg (19 grams) and 52.4° C. to 54.4° C. at 13 mm. (18 grams) were combined.

In Run 2, 832 grams of the effluent was cooled in a 2 liter, 3-necked flask with stirring and KOH was added until the saturated solution temperature was not over 80° C. The upper phase which separated was removed, and this fraction, amounting to 154 grams was fractionated at aspirator pressure. Fractions boiling at 30.5° C. to 47° C. at 14 mm. (20 grams), 50° C. to 67° C. at 14 mm. (63.1 grams) and 61° C. at 14 mm. (11.1 grams) were collected. The latter two of these fractions were combined with the fractions from Run 1. Thus, the total combined fractions from the two runs amounted to 111 grams.

87.6 grams of the combined fractions were then fractionated in a column packed with glass helices. A fraction boiling at 63° C. at 56 mm. Hg abs. pressure, $n_D^{20}=1.4103$ was removed and analyzed. This fraction amounted to 12.2 grams.

Vapor phase chromatographic analysis of the fraction indicated a purity of 98 to 99½ percent. Mass spectroscopy indicated a molecular weight of 84. Elemental analysis showed the material to contain 56.96 weight percent C, 9.72 weight percent H and 33.2 weight percent N. The density of the material was 0.86 as measured on a Fisher gravitometer. These facts establish that the compound is dimethylaminoacetonitrile and are in close agreement with the properties of the compound as given by R. A. Turner in JACS, 68, 1607 (1946).

| Analysis | Reaction Product | "Literature" Values for Dimethylaminoacetonitrile |
|---|---|---|
| C | 56.96 | 57.11 |
| H | 9.72 | 9.58 |
| N | 33.2 | 33.3 |
| Boiling point, reduced pressure, ° C. @ 56 mm. | | |
| Boiling point, corrected to atmos., ° C. | Ca. 140 | 134–7 |
| Density | 0.86 | 0.8634 |
| $n_D^{20}$ | 1.4103 | 1.4095 |
| Picrate, M.P., ° C. | 170–72 | 171.5–172.5 |

EXAMPLE II

A run was carried out in which dimethylamine was converted over a chromia-alumina dehydrogenation catalyst.

In this run, dimethylamine was fed into a heated catalyst tube from a small stainless steel bomb and through a rotameter. The catalyst tube was packed with a 3 cm. depth of Berl saddles which acted as a preheat section, and with 7 cm. of ⅛-inch pellets of 20–80 chromia-alumina catalyst. Dimethylamine was passed through the catalyst bed at a rate such that approximately 60 grams of amine was charged in 50 minutes. The following table summarizes the conditions employed in this run.

| Time, minutes | Temp. of Preheat Section, °C. | Temp. of Catalyst Bed, ° C. | | |
|---|---|---|---|---|
| | | Top | Center | Bottom |
| 0 | 538 | 538 | 546 | 536 |
| 2 | | 532 | 504 | 504 |
| 5 | 536 | 532 | 502 | 499 |
| 10 | 502 | 541 | 504 | 499 |
| 30 | | 538 | 502 | 499 |
| 40 | 521 | 524 | 510 | 510 |
| 50 | 521 | 529 | 516 | 513 |

The material collected in the trap and receiver were combined, and the unreacted dimethylamine was distilled off through a simple distillation apparatus by heating to a pot temperature of 40° C. The residue, amounting to 17.24 grams, was then charged to an 8 mm., packed Todd precise fractionating column. The fractionation details were as follows:

*Fractionation*

| Cut No. | Head Temp., ° C. | Pot Temp., ° C. | Press., mm. Hg abs. | Reflux Ratio | Grams Overhead | $n_D^{20}$ |
|---|---|---|---|---|---|---|
| 1 | 52 | 130 | 760 | 10/1 | 0.47 | |
| 2 | 66.5 | 130 | 760 | 20/1 | 1.24 | |
| 3 | 75 | 143 | 760 | 20/1 | 1.20 | 1.3600 |
| 4 | 80 | 148 | 760 | 20/1 | 0.80 | 1.3502 |
| 5 | 80 | 150 | 760 | 20/1 | 0.49 | 1.3526 |
| 6 | 70 | 103 | 78 | 15/1 | 0.98 | 1.4086 |
| 7 | 70 | 115 | 77 | 15/1 | 0.84 | 1.4095 |
| 8 | 70 | 130 | 77 | 15/1 | 0.74 | 1.4093 |
| 9 | 66 | 148 | 22 | 15/1 | 1.15 | 1.4194 |

An infrared spectrum of Cut No. 7 above indicated that the compound was identical to the material produced in Example I. A picrate of Cut No. 8 above melted at 170–172° C., the same as the picrate of the material of Example I. The refractive index of Cut No. 7 above is the same given by Turner, JACS, 68, 1607 (1946), for dimethylaminoacetonitrile. The density of Cut No. 8 above was measured and found to be 0.857 at 24° C. It is apparent from the above findings that the contacting of dimethylamine with a dehydrogenation catalyst under the specified conditions yields dimethylaminoacetonitrile.

Reasonable variation and modification are possible within the scope of the foregoing disclosure and the appended claims to the invention, the essence of which is that dimethylamine can be converted to dimethylaminoacetonitrile by subjecting the same to an elevated temperature, in one operation in the presence of a catalyst, and in another operation, to oxidative dehydrogenation conditions, as set forth and described.

We claim:

1. A process for the production of dimethylaminoacetonitrile which comprises heating dimethylamine at a temperature in the approximate range 400–900° C. and recovering dimethylaminoacetonitrile thus formed.

2. A process for the production of dimethylaminoacetonitrile which comprises subjecting dimethylamine to dehydrogenation conditions at a temperature in the range of from about 400° C. to about 900° C.

3. A process for the production of dimethylaminoacetonitrile which comprises subjecting dimethylamine to oxidative dehydrogenation conditions at a temperature in the approximate range 750–900° C. and recovering product thus formed.

4. A process for the production of dimethylaminoacetonitrile which comprises subjecting dimethylamine to dehydrogenation conditions at a temperature in the approximate range 400–750° C. in the presence of a dehydrogenation catalyst.

5. A process for the production of dimethylaminoacetonitrile which comprises subjecting dimethylamine to conditions of dehydrogenation at a temperature in the approximate range 400–750° C. in the presence of a chromia-alumina dehydrogenation catalyst.

6. A process for the production of dimethylaminoacetonitrile which comprises mixing together air, steam, and dimethylamine at a temperature in the approximate range 400–900° C. under conditions ensuring turbulence and rapid thorough mixing, then quenching the reaction mass thus obtained after a lapsed reaction time of the order of about 10 milliseconds, venting non-condensibles and recovering from the quenched and vented reaction mass dimethylaminoacetonitrile.

7. A process for the production of dimethylaminoacetonitrile which comprises contacting dimethylamine and a dehydrogenation catalyst at a temperature in the range 400–900° C. to convert an appreciable proportion thereof to dimethylaminoacetonitrile and recovering the latter from the reaction mass thus obtained.

8. A process according to claim 7 wherein the catalyst is chromia-alumina dehydrogenation catalyst.

9. A process according to claim 7 wherein the catalyst is selected from the group consisting of chromia-alumina, thorium oxide on alumina and chromium oxide together with at least one of alkaline earth metal oxides, alkali metal oxides, alkaline earth metal hydroxides and alkali metal hydroxides; a catalyst containing about by weight percent, 0.5–5 $Cr_2O_3$, 15–30 $CaCO_3$, and the remainder, $Fe_2O_3$; and a catalyst containing by weight percent about 10–60 KF, 0.2–20 $Cr_2O_3$, and the remainder, $Fe_2O_3$.

10. A process for the production of dimethylaminoacetonitrile which comprises heating dimethylamine at a temperature in the approximate range 400–700° C. employing a dehydrogenation catalyst effective to convert an appreciable amount of dimethylamine to dimethylaminoacetonitrile and then recovering the latter from the thus-obtained reaction mass.

11. A process according to claim 10 wherein the catalyst is a chromia-alumina dehydrogenation catalyst.

References Cited in the file of this patent

Medows et al.: J. Phys. Chem., vol. 65, December 1961, pp. 2139–2143, QD–1–J9.